United States Patent [19]

Ertinger

[11] 4,437,322
[45] Mar. 20, 1984

[54] HEAT EXCHANGER ASSEMBLY FOR A REFRIGERATION SYSTEM

[75] Inventor: Richard E. Ertinger, Liverpool, N.Y.

[73] Assignee: Carrier Corporation, Syracuse, N.Y.

[21] Appl. No.: 373,953

[22] Filed: May 3, 1982

[51] Int. Cl.³ ............................................. F25B 39/02
[52] U.S. Cl. ........................................ 62/504; 62/115; 62/510
[58] Field of Search .......................... 62/115, 504, 510

[56] References Cited

U.S. PATENT DOCUMENTS

| 2,277,647 | 3/1942 | Jones | 62/115 |
|---|---|---|---|
| 2,791,105 | 5/1957 | Aronson | 62/115 |
| 3,022,638 | 2/1962 | Caswell et al. | 62/115 |
| 3,315,485 | 4/1967 | Clark et al. | 62/218 |
| 3,365,899 | 1/1968 | Cuny et al. | 62/504 X |
| 3,365,900 | 1/1968 | Clark et al. | 62/115 |
| 3,553,974 | 1/1971 | Osborne | 62/115 |
| 3,882,689 | 5/1975 | Rogers | 62/9 |
| 4,141,708 | 2/1979 | Lavigne, Jr. et al. | 62/117 |
| 4,142,381 | 3/1979 | Lavigne, Jr. | 62/510 |
| 4,144,717 | 3/1979 | Anderson et al. | 62/117 |
| 4,171,623 | 10/1979 | Lavigne, Jr. | 62/196 |
| 4,207,749 | 6/1980 | Lavigne, Jr. | 62/115 |

Primary Examiner—Lloyd L. King
Attorney, Agent, or Firm—David L. Adour

[57] ABSTRACT

A heat exchanger assembly for a refrigeration system is disclosed. The assembly is a single vessel construction having an evaporator, condenser and flash subcooler. A plate inside the shell separates the evaporator from the condenser and the flash subcooler, and a partition inside the vessel separates the condenser from the flash subcooler. Removable orifice means in the partition control flow of refrigerant into the subcooler from the condenser. Removable solid pipe plugs in the shell of the vessel provide access to the orifice means so that, if desired, an individual orifice means may be removed and replaced with another, different sized orifice means.

15 Claims, 4 Drawing Figures

HEAT EXCHANGER ASSEMBLY FOR A REFRIGERATION SYSTEM

BACKGROUND OF THE INVENTION

The present invention relates to refrigeration systems and more particularly relates to heat exchanger assemblies for refrigeration systems.

Typically, vapor compression refrigeration systems include a compressor, refrigerant flow control devices, and a heat exchanger assembly with at least a condenser and an evaporator. Liquid refrigerant in the evaporator is evaporated by absorbing heat from a medium which is thereby cooled. The evaporator is connected to the compressor so that the gaseous refrigerant from the evaporator flows to the compressor which increases the temperature and pressure of this gaseous refrigerant. The condenser receives the hot gaseous refrigerant from the compressor and cools the refrigerant so that it changes state to a liquid refrigerant which flows, through a refrigerant flow control device, back to the evaporator to begin another heat transfer cycle.

In order to improve the efficiency of a vapor compression refrigeration system, the condenser may include a subcooler for reducing the temperature of the liquid refrigerant flowing to the evaporator. For example, U.S. Pat. No. 3,365,900 to Clark, et al. shows a "sensible subcooler" wherein the temperature of liquid refrigerant in the subcooler is reduced below the condenser saturation temperature by circulating cooling water through a tube bundle in the subcooler. No refrigerant is flashed in the subcooler, thus sensible heat, rather than latent heat, transfer occurs in the subcooler. As shown in the Clark, et al. patent the subcooler is designed so that liquid refrigerant from the condenser flows into the subcooler through an opening in a top part of the subcooler. Liquid refrigerant flows out of the subcooler, through an opening in a bottom part of the subcooler, to a refrigerant metering box for the evaporator.

It is not always practical to improve the efficiency of a vapor compression refrigeration system by using a sensible subcooler. For example, if a low pressure refrigerant, such as R-11, is used in the refrigeration system then a sensible subcooler may not be practical because of the large pressure drop that is required to force the condensed liquid refrigerant through the subcooler. Other kinds of subcoolers may be useful in this type of situation. For example, the condenser of the refrigeration system may include a "flash subcooler" wherein liquid refrigerant from the condenser flows to a subcooler wherein a portion of the liquid refrigerant is flashed thereby absorbing heat from the remaining liquid refrigerant in the subcooler. In this context, and as generally used throughout this patent specification, the term "flash subcooler" is somewhat a misnomer because liquid refrigerant is not subcooled to a temperature below the condenser saturation temperature. Instead, there is a lower pressure in the subcooler which yields a subcooler refrigerant saturation temperature which is less than the condenser refrigerant saturation temperature. However, this provides the same refrigeration cycle benefits as a true subcooler wherein liquid refrigerant is subcooled to a temperature below the condenser saturation temperature.

In a flash subcooler, it is necessary to recycle or otherwise despose of the flashed refrigerant in the subcooler. One way of disposing of the flashed refrigerant is to direct the flashed refrigerant from the subcooler back to the compressor for recycling through the condenser. In order to achieve this flow, the subcooler is connected to a second compressor, or to an intermediate pressure stage of a multi-stage compressor if the refrigeration system utilizes a multi-stage compressor, to provide a pressure difference for extracting the gaseous refrigerant from the subcooler. Alternatively, flashed refrigerant in a subcooler may be disposed of by recondensing the flashed refrigerant directly in the subcooler. This is advantageous because it eliminates the need for extracting flashed refrigerant from the subcooler. Also, the subcooler is adaptable for retrofit to vapor compression refrigeration systems having only one, single stage compressor. U.S. Pat. Nos. 4,207,749 and 4,142,381 show vapor compression refrigeration systems utilizing flash subcoolers wherein flashed refrigerant is recondensed directly in the subcooler.

Heat exchanger assemblies for refrigeration systems having condensers with subcoolers as described above, may comprise separate tube and shell constructions, that is, separate vessels, for the evaporator, condenser, and subcooler. However, this type of construction is relatively complex and costly because of valving and piping interconnections between each vessel and because of the separate shell and fluid flow circuits which are part of each vessel. Therefore, in order to reduce costs and complexity, an evaporator and condenser are often constructed as sections of a single vessel with a plate inside the vessel separating the evaporator from the condenser. Sometimes, a subcooler is built in as part of the condenser section of the vessel. For example, U.S. Pat. No. 3,365,900 to Clark, et al., shows such a single vessel construction with a sensible subcooler. In general, a single vessel construction is more reliable than a multiple vessel construction because of the reduction in complexity of the heat exchanger assembly.

A single vessel construction for a heat exchanger assembly incorporating a flash subcooler wherein flashed refrigerant is recondensed in the subcooler is especially desirable because of the versatility of a refrigeration system utilizing such a heat exchanger assembly. As discussed previously, even refrigeration systems having only one, single stage compressor may use such a heat exchanger assembly. Also, a refrigeration system utilizing such a single vessel heat exchanger assembly may be used in a wider range of applications if the heat exchanger assembly may be easily adapted to a variety of design point or full load operating conditions.

SUMMARY OF THE INVENTION

Therefore, an object of the present invention is to provide a relatively simple, inexpensive and reliable heat exchanger assembly for a refrigeration system utilizing a flash subcooler wherein flashed refrigerant is recondensed in the subcooler.

Another object of the present invention is to provide a single vessel heat exchanger assembly for a refrigeration system utilizing a flash subcooler wherein flashed refrigerant is recondensed in the subcooler.

A further object of the present invention is to provide a single vessel heat exchanger assembly which may be relatively easily modified for use under different design point operating conditions for a refrigeration system utilizing a flash subcooler wherein flashed refrigerant is recondensed in the subcooler.

These and other objects of the present invention are attained by a heat exchanger assembly for a refrigeration system wherein a single shell encloses a heat transfer tube bundle and a plate inside the shell divides the tube bundle into an upper condenser portion and a lower evaporator portion. A partition inside the shell in the condenser portion divided the condenser portion into a condenser section and a flash subcooler section. There is an inlet into the condenser section for receiving gaseous refrigerant from the compressor of the refrigeration system. Several orifice means in the partition between the condenser section and the flash subcooler section provide passageways for the flow of refrigerant from the condenser section into the flash subcooler section. The orifice means are sized and positioned to provide a selected pressure difference between the condenser and flash subcooler sections when refrigerant is flowing through the orifice means. One or more orifice means in the partition is removable and, if desired, a particular orifice means may be removed and replaced with a different sized orifice means. The shell for the heat exchanger assembly includes removable solid plugs for gaining access to the orifice means in order to remove and replace individual orifice means.

A cooling medium flowing through heat transfer tubing in the upper part of the flash subcooler section recondenses the flashed refrigerant directly in the subcooler. The relatively cool liquid refrigerant from the flash subcooler section flows through an outlet to the lower evaporator portion of the heat exchanger assembly. This liquid refrigerant is evaporated by absorbing heat from a medium flowing through tubing in the evaporator portion and there is an outlet for discharging gaseous refrigerant from the evaporator portion back to the compressor.

BRIEF DESCRIPTION OF THE DRAWINGS

Other objects and advantages of the present invention will be apparent from the following detailed description in conjunction with the accompanying drawings, in which like reference numerals identify like elements, and in which.

DESCRIPTION OF THE PREFERRED EMBODIMENT

Figures 1, 4:
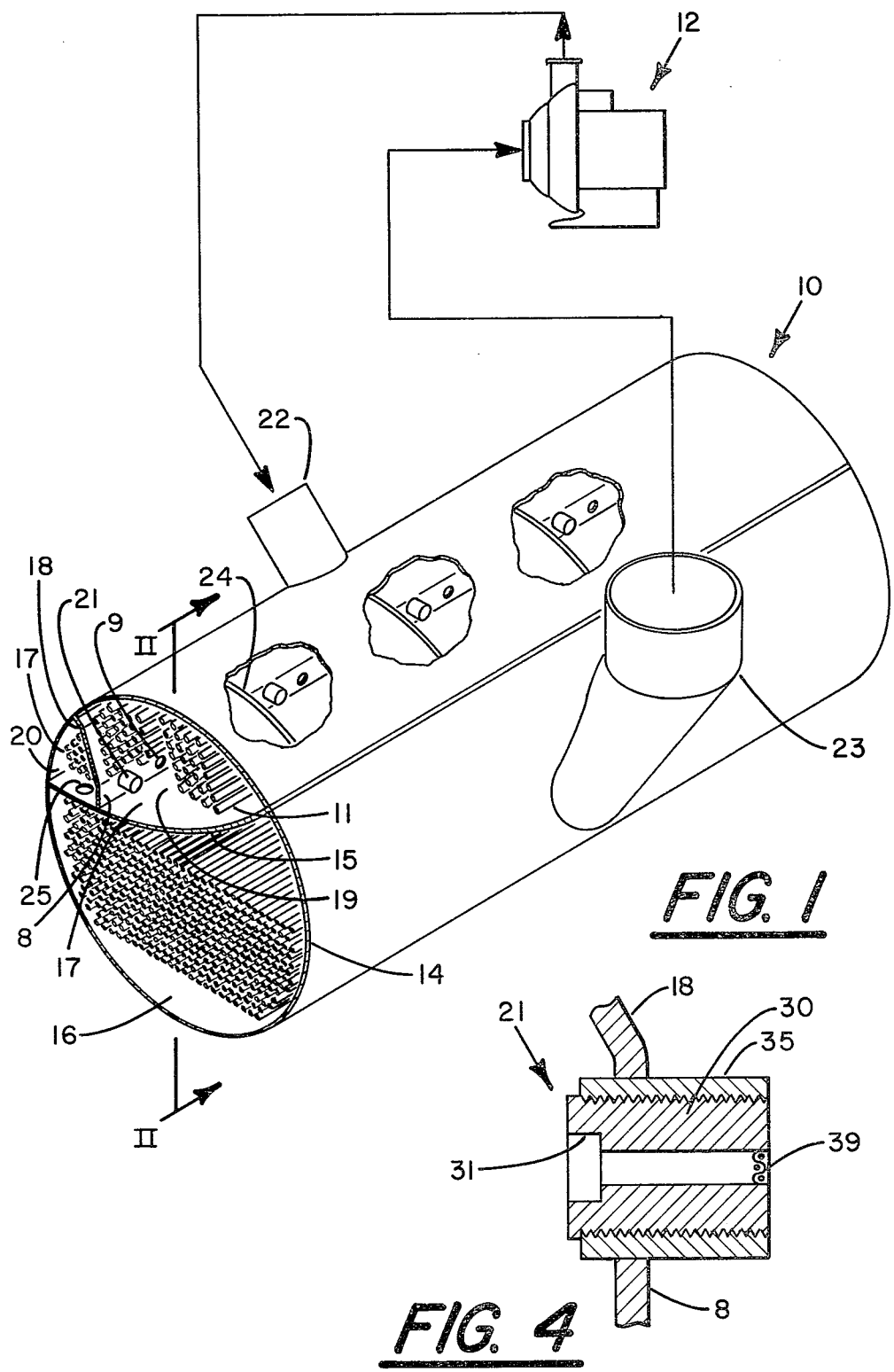
FIG. 1 is an illustration of a refrigeration system having a heat exchanger assembly according to the present invention.
FIG. 4 is an enlarged, detailed view in cross section of the orifice means shown in FIG. 2.
Figure 2:
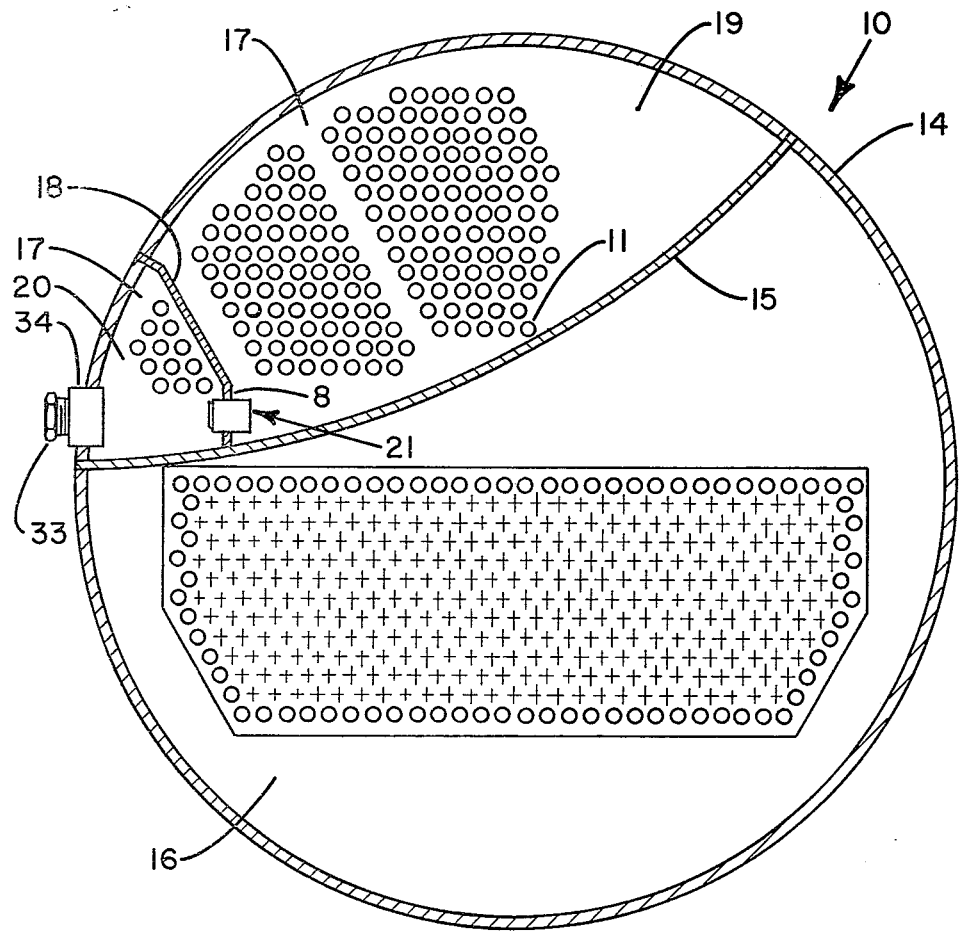
FIG. 2 shows a cross section along the axis II—II of the heat exchanger assembly shown in FIG. 1.

Referring to FIGS. 1 and 2, an illustration of a refrigeration system having a heat exchanger assembly 10 according to the present invention is shown. The heat exchanger assembly 10 may be used with either a high or a low pressure refrigerant. Also, it should be noted that the term "refrigerant" is used herein in a generic sense to mean any kind of heat exchange medium suitable for use in the assembly 10 as described hereinafter.

The assembly 10 is connected to a compressor 12, as indicated in FIG. 1, to form the refrigeration system. As shown in FIGS. 1 and 2, the heat exchanger assembly 10 includes a cylindrical shell 14 having a plurality of tubes, such as tube 11, located inside the shell 14, generally parallel to the longitudinal axis of the cylindrical shell 14, to form a cylindrical shell and tube type heat exchanger. Of course, if desired, the shell 14 may be spherical, a rectangular box, or any of a variety of other shapes. A plate 15 located inside the shell 14 divides the shell 14 into a bottom evaporator portion 16 and a top condenser portion 17. A partition 18 located inside the shell 14 in the condenser portion 17 divides the condenser portion 17 into an upper condenser section 19 and a lower flash subcooler section 20. There are a plurality of orifice means, such as orifice means 21, in the partition 18 providing a passageway for the flow of refrigerant from the condenser section 19 into the flash subcooler section 20. A plurality of fixed holes, such as hole 9, are also provided for interconnecting the condenser section 19 and the flash subcooler section 20.

As shown in FIG. 1, a condenser section inlet 22 in the top of the cylindrical shell 14 provides a passageway for the flow of refrigerant from the compressor 12 into the condenser section 19 of the heat exchanger assembly 10. There is at least one outlet, such as subcooler section outlet 25, providing a passageway for the flow of refrigerant from the subcooler section 20 to the evaporator portion 16. Preferably, this outlet leads to a flow control device (not shown) for the evaporator portion 16. An evaporator portion outlet 23, attached to the cylindrical shell 14, provides a passageway for the flow of refrigerant out of the evaporator portion 16.

Also, as shown in FIGS. 1 and 2, the plate 15 and partition 18 are located within the shell 14 so that a selected number of tubes are located in the bottom evaporator portion 16, the upper condenser section 19, and the lower flash subcooler section 20. The tubes in the bottom evaporator portion 16 comprise one fluid flow circuit through which a fluid flows which is to be cooled by the evaporating refrigerant. The tubes in the top condenser portion 17 provide a fluid flow circuit for cooling fluid which cools the refrigerant as it passes through the condenser portion 17.

The tubes in the upper condenser section 19 and the lower flash subcooler section 20 of the top condenser portion 17, may comprise a single, continuous fluid flow circuit or each section may have its own separate fluid flow circuit. If the condenser portion 17 has a single, continuous fluid flow circuit then it is desirable to direct the cooling fluid first through the tubing in the flash subcooler section 20 and then through the tubing in the condenser section 19. This provides colder cooling fluid to the flash subcooler section 20 than to the condenser section 19. If the condenser portion 17 has separate fluid flow circuits in the condenser section 19 and flash subcooler section 20 then it is desirable to have the cooling fluid flowing through the tubing in the flash subcooler section 20 at a lower temperature than the cooling fluid flowing through the tubing in the condenser section 19, The colder cooling fluid flowing through the tubing in the flash subcooler section 20 is desirable so that the flash subcooler section 20 may most effectively perform its functions including efficiently recondensing refrigerant flashed in the flash subcooler section 20.

As shown in FIG. 1, there may be a plurality of tube support sheets, such as planar tube support sheet 24, positioned within the shell 14 to support the tubes inside the heat exchanger assembly 10. The tube support sheets are spaced apart and positioned in a row along the longitudinal axis of the cylindrical shell 14 with each tube support sheet generally perpendicular to the plate 15. Of course, the tube support sheets may be oriented in any manner which will provide the required support for the tubes. Three tube support sheets are shown in FIG. 1, but, of course, the number of tube support sheets, if any, which are used depends on the size and construction of a particular heat exchanger assembly.

The plate 15 dividing the shell 14 into a bottom evaporator portion 16 and top condenser portion 17, may be made of a single piece of metal or any other suitable material. As shown in FIGS. 1 and 2, the plate 15 is a generally rectangular, curved planar barrier between the evaporator portion 16 and top condenser portion 17. The longitudinal axis of this planar barrier is generally parallel to the longitudinal axis of the cylindrical shell 14. The plate 15 may have any of a variety of configurations. For example, if one piece tube support sheets are used in the cylindrical shell 14 then the plate 15 may consist of a plurality of separate plates extending between the tube support sheets.

The partition 18 dividing the top condenser portion 17 into an upper condenser section 19 and a lower flash subcooler section 20, may be made of metal or any other suitable material. As shown in FIGS. 1 and 2, the partition 18 is a generally rectangular, angled planar barrier between the condenser section 19 and flash subcooler section 20. The partition 18 is generally oriented perpendicular to the plate 15. Like the plate 15, the partition 18 may have any of a variety of configurations. For example, if one piece tube support sheets are used in the shell 14 then the partition 18 may be a series of separate partitions extending between the tube support sheets. Another alternative is to use a slotted partition 18 which allows use of single piece tube support sheets in the top condenser portion 17. Each tube support sheet would extend through a slot in the partition 18 so that part of the tube support sheet is in the flash subcooler section 20 and the rest of the tube support sheet is in the condenser section 19. Each tube support sheet would be welded or otherwise suitably attached to the partition 18 to form a fluid tight seal between the condenser section 19 and the flash subcooler section 20 at the location of each slot.

Also, as shown in FIG. 1, there are four orifice means, such as orifice means 21, in the partition 18 for regulating flow of refrigerant from the condenser section 19 to the flash subcooler section 20. Each orifice means is located generally in the center of each bay formed between the tube support sheets. In addition, there are four simple, fixed holes, such as the hole 9, in the partition 18 located so that there is one hole in each bay. The holes are sized to pass the minimum expected flow of refrigerant from the condenser section 19 to the flash subcooler section 20 for a particular refrigeration system. Then, the size of the openings in the orifice means are chosen to accommodate a design load for the refrigeration system when used in a particular application that requires refrigerant flow area greater than that provided by the fixed holes.

The sizing of the openings in the orifice means and of the fixed holes is determined by considering the refrigerant flow rate required in the refrigeration system to accomplish a particular application and the pressure difference which it is desired to maintain between the condenser section 19 and the flash subcooler section 20. For example, the openings in the orifice means means may be sized in combination with the fixed holes to accommodate the refrigerant flow rate at full load operating conditions of the refrigeration system when used for a particular application. It is better to size the openings for maximum flow rather than to undersize the openings because if the openings are too small then refrigerant may build up in the condenser section 19 rather than flowing through the flash subcooler section 20 to the evaporator portion 16 and this may prevent operation of the refrigeration system. However, even if the openings are slightly oversized this may reduce the performance advantage of the flash subcooler section 20 but will not prevent operation of the refrigeration system.

Referring to FIG. 2, which is a cross-sectional view along the axis II—II of the heat exchanger assembly 10 shown in FIG. 1, it can be seen how access to each orifice means, specifically orifice means 21, may be obtained through an access hole in the shell 14. As shown in FIG. 2, the access hole is aligned with the orifice means 21 and is filled with a solid pipe plug 33 screwed into an internally threaded coupling 34. This alignment is facilitated if the orifice means 21 is located in a part 8 of the partition 18 which is oriented generally perpendicular to the axis of the access hole, as shown in FIG. 2, since it is easier to install the orifice means 21 perpendicular to the partition 18 than to install the orifice means 21 in the partition 18 at other angles. The coupling 34 may be welded into position in the shell 14 or otherwise held in position to form a fluid tight seal. Access to the orifice means 21 is obtained by removing the solid pipe plug 33 from the access hole. For a heat exchange assembly built for a specific application, the properly sized orifice means may be simply installed while there is access to the inside of the assembly during construction of the assembly before shipment to the job site. For stock machines and for field changes, access to each orifice means is provided by removing the corresponding solid pipe plug from its opening in the shell 14. In this manner, if the design conditions for the refrigeration system are changed then the heat exchanger assembly can be easily modified to provide the proper orifice means to obtain proper performance at the new design conditions.

Referring to FIG. 4, an enlarged, detailed view is shown of the cross section of the orifice means 21 shown in FIG. 2. This is only one example of a suitable removable orifice means which can be used in the partition 18. As shown in FIG. 4, the orifice means 21 is screwed into a hollow coupling member 35 having threads on its interior to receive the orifice means 21. The hollow coupling member 35 extends through an opening in the partition 18 and may be welded to the partition 18 or otherwise suitably attached to the partition 18 to form a fluid tight seal.

As shown in FIG. 4, the orifice means 21 is a hollow pipe plug having a solid body portion 30, with an opening therethrough, and a socket 31 recessed into the body portion 30. The body portion 30 is threaded on its outer surface to mate with the coupling member 35. A screen 39 prevents debris, or other such material which may be present in the refrigerant and which could clog the orifice means 21, from entering the opening in the orifice means 21. Although a flat, planar screen 39 is shown in FIG. 4, the screen 39 may have any of a variety of shapes, such as conical or hemispherical, to further aid in preventing debris from clogging the orifice means 21. Alternatively, if desired, the screen 39 may not even be attached to the orifice means 21 but may be positioned upstream of the orifice means 21 and attached between the partition 18 and the plate 15 to filter the refrigerant flowing to the orifice means 21.

The socket 31 of the orifice means 21 is designed to interface with a tool which is inserted through the access hole in the shell 14 after the solid pipe plug 33 is removed. It is desirable to use such a tool because access holes in the shell 14 should be made as small as possible to keep leak potential low and to reduce cost. Therefore, it is desirable to provide an orifice means 21 which may be easily installed and removed by a relatively small tool which fits through the access hole in the shell 14. The socket 31 on the orifice means 21 is designed to interface with the tool so that the orifice means 21 may be screwed either into or out of the coupling member 35.

Figure 3:
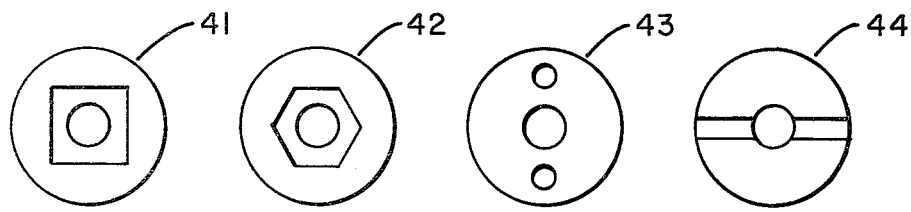
FIG. 3 shows end views of various orifice means which are examples of the orifice means shown in FIGS. 1 and 2.

Referring to FIG. 3, four possible configurations for the socket 31 of the orifice means 21 are shown. Specifically, a square socket 41, a hexagonal socket 42, a spanner socket 43 and a slotted socket 44 are shown. The tool (not shown) used to insert and remove the orifice means 21 from the threaded coupling member 35 would have a corresponding mating part for insertion into each specific socket configuration. The orifice means 21 may be made of a magnetic material and the tool may be magnetic to help retain the orifice means 21 on the tool when inserting or removing the orifice means 21. Also, an orifice means 21 with a long unthreaded tapered lead may be helpful in initially inserting and threading the orifice means 21 into the coupling member 35.

In operation, a refrigeration system having a heat exchanger assembly 10 as shown in FIG. 1, uses a refrigerant such as refrigerant R-11, which is evaporated in the evaporator portion 16 to cool a fluid flowing through the tubing in the evaporator portion 16. The gaseous refrigerant from the evaporator portion 16 leaves the evaporator portion 16 via the evaporator portion outlet 23 and is directed to the compressor 12 which compresses the gaseous refrigerant and supplies this relatively hot gaseous refrigerant to the condenser section 19 through the condenser section inlet 22.

The cooling fluid flowing through the tubes in the condenser section 19 condenses the gaseous refrigerant to its liquid state and this liquid refrigerant is supplied through the orifice means, such as orifice means 21, and holes, such as hole 9, in the partition 18 to the flash subcooler section 20. Some of the liquid refrigerant flowing through the orifice means is flashed to cool the remaining liquid refrigerant in the subcooler section 20. The cool liquid refrigerant from the subcooler section 20 is supplied through the subcooler section outlet 25 and any associated flow control device, to the evaporator portion 16. The flashed refrigerant in the subcooler section 20 is recondensed by the flow of the cooling fluid through the tubes in the flash subcooler section 20 which absorb heat from the flashed refrigerant thereby recondensing this gaseous refrigerant in the same manner as refrigerant is condensed in the condenser section 19.

The orifice means, such as orifice means 21, are sized and positioned to control the flow of liquid refrigerant from the condenser section 19 to the flash subcooler section 20. The orifice means are designed to maintain a pressure drop between condenser section 19 and flash subcooler section 20 that will yield a desired lowering of the refrigerant saturation temperature to produce the desired "subcooling" effect. As discussed previously, the size of the openings in the orifice means are used to provide this desired control of refrigerant flow. Also, as discussed previously, the orifice means are removable so that individual orifice means may be replaced with orifice means having a different sized opening to tailor the heat exchanger assembly 10 to design conditions for the refrigeration system when used in a particular application.

The foregoing description is only one preferred example of a refrigeration system which may utilize a heat exchanger assembly according to the present invention. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A heat exchanger assembly comprising
    a shell enclosing a heat transfer tube bundle to form a shell and tube type heat exchanger;
    a partition means inside the shell for dividing the tube bundle into at least a condenser section and a flash subcooler section with each section having a number of tubes passing therethrough to provide sufficient cooling for condensing gaseous refrigerant directly in each section;
    an inlet means into the condenser section for providing a passageway for flow of refrigerant into the shell side of the condenser section;
    at least one orifice means in the partition means for providing a passageway for the flow of the refrigerant from the condenser section to the flash subcooler section, said orifice means sized and positioned to regulate refrigerant flow between the condenser section and the flash subcooler section to provide a selected pressure difference between the condenser section and the flash subcooler section which is sufficient to ensure that a portion of any liquid refrigerant normally flowing from the condenser section through the orifice means to the flash subcooler section is flashed in the subcooler section to absorb heat from the remaining liquid refrigerant which flows into the flash subcooler section; and
    an outlet means from the flash subcooler section for providing a passageway for the flow of the refrigerant out of the flash subcooler section.

2. A heat exchanger assembly comprising:
    a shell enclosing a heat transfer tube bundle to form a shell and tube type heat exchanger;
    a partition means inside the shell for dividing the tube bundle into a least a condenser section and a flash subcooler section with each section having a number of tubes passing therethrough to provide sufficient cooling for condensing gaseous refrigerant directly in each section;
    an inlet means into the condenser section for providing a passageway for flow of refrigerant into the shell side of the condenser section;
    an externally threaded hollow pipe plug screwed into a threaded coupling member in the partition means for providing a passageway for the flow of the refrigerant from the condenser section to the flash subcooler section, said hollow pipe plug sized and positioned to provide a selected pressure difference between the condenser section and the flash subcooler section when refrigerant is flowing from the condenser section through the hollow pipe plug to the flash subcooler section; and an outlet means from the flash subcooler section for providing a passageway for the flow of the refrigerant out of the flash subcooler section.

3. A heat exchanger assembly as recited in claim 2, further comprising:
a removable solid pipe plug means in the shell aligned with the threaded hollow pipe plug to provide access to the hollow pipe plug when the solid pipe plug is removed.

4. A heat exchanger assembly as recited in claim 3 wherein the hollow pipe plug comprises:
a body portion having an opening therethrough and threaded on its outer surface; and
a socket means recessed into the body portion for accommodating a tool for screwing said pipe plug into and out of the threaded coupling member in the partition means.

5. A heat exchanger assembly as recited in claim 4 further comprising:
a screen means, attached to the end of the body portion of the hollow pipe plug opposite the socket means, for covering the body portion opening, to filter flow through the opening in the body portion.

6. A heat exchanger assembly comprising:
a shell enclosing a heat transfer tube bundle to form a generally cylindrical shell and tube type heat exchanger;
a plate means inside the shell for dividing the tube bundle along a plane generally parallel to the longitudinal axis of the heat exchanger into a top condenser portion and a bottom evaporator portion;
a partition means inside the shell in the condenser portion intersecting the shell and the plate means, for dividing the condenser portion, along a plane generally oriented perpendicular to the plate means, into an upper condenser section and a lower flash subcooler section, with each section having a number of tubes passing therethrough to provide sufficient cooling for condensing gaseous refrigerant directly in each section;
a condenser section inlet means in the top of the shell for providing a passageway for the flow of refrigerant into the condenser section;
at least one orifice means in the partition means near the intersection of the partition means and the plate means for providing a passageway for the flow of the heat exchange fluid from the condenser section into the flash subcooler section, said orifice means sized and positioned to regulate refrigerant flow between the condenser section and the flash subcooler section to provide a selected pressure difference between the condenser section and the flash subcooler section which is sufficient to ensure that a portion of any liquid refrigerant normally flowing from the condenser section through the orifice means to the flash subcooler section is flashed in the subcooler section to absorb heat from the remaining liquid refrigerant which flows into the flash subcooler section; and
a subcooler section outlet means in the plate means for providing a passageway for the flow of the refrigerant out of the flash subcooler section into the bottom evaporator portion; and
an evaporator portion outlet means for providing a passageway for the flow of the refrigerant out of the evaporator portion.

7. A heat exchanger assembly comprising:
a shell enclosing a heat transfer tube bundle to form a generally cylindrical shell and tube type heat exchanger;
a plate means inside the shell for dividing the tube bundle along a plane generally parallel to the longitudinal axis of the heat exchanger into a top condenser portion and a bottom evaporator portion;
a partition means inside the shell in the condenser portion intersecting the shell and the plate means, for dividing the condenser portion, along a plane generally oriented perpendicular to the plate means, into an upper condenser section and a lower flash subcooler section, with each section having a number of tubes passing therethrough to provide sufficient cooling for condensing gaseous refrigerant directly in each section;
a condenser section inlet means in the top of the shell for providing a passageway for the flow of refrigerant into the condenser section;
a plurality of externally threaded hollow pipe plugs each screwed into one of the plurality of threaded coupling members located in the partition means near the intersection of the partition means and the plate means with each coupling member spaced apart a selected distance for providing a passageway for the flow of the heat exchange fluid from the condenser section into the flash subcooler section, said hollow pipe plugs sized and positioned to provide a selected pressure difference between the condenser section and the flash subcooler section when refrigerant is flowing from the condenser section through the hollow pipe plugs to the flash subcooler section;
a subcooler section outlet means in the plate means for providing a passageway for the flow of the refrigerant out of the flash subcooler section into the bottom evaporator portion; and
an evaporator portion outlet means for providing a passageway for the flow of the refrigerant out of the evaporator portion.

8. A heat exchanger assembly as recited in claim 7, further comprising:
a plurality of removable solid pipe plug means in the shell each aligned with one of the threaded hollow pipe plugs to provide access to each hollow pipe plug when the corresponding solid pipe plug is removed.

9. A heat exchanger assembly as recited in claim 8 wherein each hollow pipe plug comprises:
a body portion having a opening therethrough and threaded on its outer surface; and
a socket means recessed into the body portion for accommodating a tool for screwing said pipe plug into and out of the threaded coupling member in the partition means.

10. A heat exchanger assembly as recited in claim 9 further comprising:
a screen means attached to the end of the body portion of each of the hollow pipe plugs opposite the socket means of said pipe plug, to cover the body portion opening in said hollow pipe plug to filter flow through the opening in the body portion.

11. A vapor compression refrigeration system with a refrigerant which is evaporated in an evaporator to cool a fluid flowing through a tube bundle in the evaporator, said system comprising:

a compressor means for receiving the flashed, gaseous refrigerant from the evaporator and for increasing the pressure of the gaseous refrigerant;

a condenser assembly for receiving the pressurized gaseous refrigerant from the compressor means and for cooling the refrigerant to a liquid state, said condenser assembly including:

a shell enclosing a tube bundle having a cooling medium flowing therethrough;

a partition means inside the shell for dividing the tube bundle into a condenser section and a flash subcooler section with each section having a number of tubes passing therethrough to provide sufficient cooling for condensing gaseous refrigerant directly in each section;

an inlet means into the condenser section for providing a passageway for the flow of gaseous refrigerant from the compressor means into the condenser section;

at least one orifice means in the partition means for providing a passageway for the flow of liquid refrigerant from the condenser section into the flash subcooler section, said orifice means sized and positioned to regulate refrigerant flow between the condenser section and the flash subcooler section to provide a selected pressure difference between the condenser section and the flash subcooler section which is sufficient to ensure that a portion of any liquid refrigerant normally flowing from the condenser section through the orifice means to the flash subcooler section is flashed in the subcooler section to absorb heat from the remaining liquid refrigerant which flows to the flash subcooler section; and an outlet means from the flash subcooler section for providing a passageway for the flow of cool liquid refrigerant from the flash subcooler section to the evaporator.

12. A vapor compression refrigeration system with a refrigerant which is evaporated in an evaporator to cool a fluid flowing through a tube bundle in the evaporator, said system comprising:

a compressor means for receiving the flashed, gaseous refrigerant from the evaporator and for increasing the pressure of the gaseous refrigerant;

a condenser assembly for receiving the pressurized gaseous refrigerant from the compressor means and for cooling the refrigerant to a liquid state, said condenser assembly including:

a shell enclosing a tube bundle having a cooling medium flowing therethrough;

a partition means inside the shell for dividing the tube bundle into a condenser section and a flash subcooler section with each section having a number of tubes passing therethrough to provide sufficient cooling for condensing gaseous refrigerant directly in each section;

an inlet means into the condenser section for providing a passageway for the flow of gaseous refrigerant from the compressor means into the condenser section;

a plurality of externally threaded hollow pipe plugs each screwed into one of a plurality of threaded coupling members located in the partition means for providing a passageway for the flow of liquid refrigerant from the condenser section into the flash subcooler section, said hollow pipe plugs sized and positioned to provide a selected pressure difference between the condenser section and the flash subcooler section so that some of the liquid refrigerant is flashed in the flash subcooler section to cool the remaining liquid refrigerant as the liquid refrigerant flows from the condenser section through the hollow pipe plugs to the flash subcooler section; and an outlet means from the flash subcooler section for providing a passageway for the flow of cool liquid refrigerant from the flash subcooler section to the evaporator.

13. A vapor compression refrigeration system as recited in claim 12, further comprising:

a plurality of removable solid pipe plug means in the shell each alighed with one of the threaded pipe plugs to provide access to each hollow pipe plug when the corresponding solid pipe plug is removed.

14. A vapor compression refrigeration system as recited in claim 13 wherein each hollow pipe plug comprises:

a body portion having an opening therethrough and threaded on its outer surface; and a socket means recessed into the body portion for accommodating a tool for screwing said pipe plug into and out of the threaded coupling member in the partition means.

15. A vapor compression refrigeration system as recited in claim 14 further comprising:

a screen means attached to the end of the body portion of each of the hollow pipe plugs opposite the socket means of said pipe plug, to cover the body portion opening in said hollow pipe plug to filter flow through the opening in the body portion.

* * * * *